United States Patent
Chohsa et al.

(10) Patent No.: US 7,382,473 B2
(45) Date of Patent: Jun. 3, 2008

(54) PROGRAM AND METHOD OF PRINT INSTRUCTION FOR PRINTER WITH PDF DIRECT PRINTING FUNCTION

(75) Inventors: Hiroyuki Chohsa, Yamato (JP); Akira Shimamura, Yamato (JP)

(73) Assignee: InfoPrint Solutions Company, LLC, Boulder, CO (US)

(*) Notice: Subject to any disclaimer, the term of this patent is extended or adjusted under 35 U.S.C. 154(b) by 1091 days.

(21) Appl. No.: 10/091,718

(22) Filed: Mar. 6, 2002

(65) Prior Publication Data
US 2002/0126306 A1    Sep. 12, 2002

(30) Foreign Application Priority Data
Mar. 9, 2001    (JP) ................. 2001-066100

(51) Int. Cl.
  *G06F 15/00*    (2006.01)
  *B41B 1/00*    (2006.01)
(52) U.S. Cl. ........... 358/1.13; 358/1.1; 358/1.15; 358/1.16; 707/1; 715/856; 715/859; 715/862
(58) Field of Classification Search ............. 358/1.1, 358/1.13, 1.15, 1.16; 707/1; 715/856, 859, 715/862
See application file for complete search history.

(56) References Cited

U.S. PATENT DOCUMENTS 5,301,321 A * 4/1994 Bell et al. ............... 718/100
5,579,126 A * 11/1996 Otsuka ..................... 358/403
6,018,345 A * 1/2000 Berstis .................... 715/859
6,519,048 B1 * 2/2003 Tanaka .................... 358/1.13
2001/0049703 A1 * 12/2001 Miyoshi et al. ............ 707/527
2002/0085224 A1 * 7/2002 Price et al. ............... 358/1.13

FOREIGN PATENT DOCUMENTS

| JP | 11242484 | 9/1999 |
| JP | 2000352902 | 12/2000 |
| JP | 2001005762 | 1/2001 |

* cited by examiner

Primary Examiner—Aung S. Moe
Assistant Examiner—Peter K. Huntsinger
(74) Attorney, Agent, or Firm—Dale M. Crockatt; Dillon & Yudell LLP

(57) ABSTRACT

A print instruction program and method for allowing a network terminal device to send print instructions to a PDF direct-printing printer in a communications network in an efficient and advantageous manner. The program and method includes the capability to obtain PDF file name and network address data from the location of a mouse pointer in a web browser screen. The file name and address data can be stored locally on the network terminal device, preferably in a list format. The program and method also provides for the display and operation of a direct print menu in association with a click on a control button of the mouse. The program and method allows the PDF file name and address data to be sent to the network-attached printer, either singly or as part of a list and either as a network address or as an actual file.

18 Claims, 7 Drawing Sheets

PROGRAM AND METHOD OF PRINT INSTRUCTION FOR PRINTER WITH PDF DIRECT PRINTING FUNCTION

FIELD OF THE INVENTION

The present invention relates to a print instruction program stored in a network terminal device outputting a print instruction to a printer with a PDF (Portable Document Format) direct printing function linked to a communication network, and to a print instruction method.

BACKGROUND ART

A network printer has been known, which is linked to a network, such as a local area network (LAN) or the Internet, and can accept a print instruction from any terminal device such as a personal computer in the network.

FIG. 6 is a view showing each function of a conventional network printer and a conventional network terminal device.

A network printer 1 is linked to the Internet 2, and can accept a print instruction from a network terminal device 3 also linked to the Internet 2.

The network printer 1 includes a PDL (Printer Description Language) decoding unit 11 for decoding PDLs according to the unique specifications of the respective printer manufacturers, and a printer engine 13 for actually printing pages of the decoded PDL.

The network terminal device 3 includes: a communication unit 31 for converting internal signals of the terminal device into network-compatible signals and vice versa; a Web browser 32 for restoring a home page written in HTML (Hyper Text Markup Language); a browser screen 33 for displaying the home page restored by the Web browser 32; a storage unit 34 for storing a PDF file in the home page displayed on the browser screen 33 when the PDF file is downloaded; a PDF reader 35 for decoding the PDF file and restoring the same to its original page contents; a PDF reader screen 36 for displaying the restored original page contents; and a printer driver 37 for converting the original page contents restored by the PDF reader 35 into PDL.

A home page site 4 managing a home page has home page data 5 written in HTML, and a network address or URL of a PDF file 51 is stored in the home page data 5.

According to the combination of the conventional network printer 1 and network terminal device 3 shown in FIG. 6, for example, when the user of the network terminal device 3 wishes to print the PDF file 51 while viewing the home page 5, the user downloads the PDF file 51 to the PDF reader 35 directly or through the storage unit 34, converts the restored original page contents into PDL by the print driver 37, and then sends to the network printer 1 through the communication unit 31. The communication unit 31 and the network printer 1 are generally linked to each other through an intra-company network.

Thus, in order to print a PDF file while viewing a home page, processing to download the PDF file and restore its original page contents after activating the PDF reader 35, and processing to convert the restored page contents into PDL by means of the printer driver 37 are absolutely necessary. For this reason, it takes quite a long time to print a PDF file with the combination of the conventional network printer 1 and network terminal device 3.

In order to solve the above problem, for example, IBM Corporation has announced a network printer, Infoprint® 21, which can decode a PDF file and is provided with an internal Web server.

FIG. 7 is a view showing each function of a network printer with a PDF direct printing capability, which can decode a PDF file and is provided with an internal Web server, and of the conventional network terminal device.

A network printer 6 includes a PDF decoding unit 12 for decoding PDF, a printer engine 13 for actually printing pages of the decoded PDF, and a Web server 14 which can communicate with a home page site 4 through the Internet 2 and with a network terminal device 7 described below, and can output a home page of the network printer 6.

The network terminal device 7 includes a communication unit 31, a Web browser 32, a browser screen 33, and a storage unit 34 similar to those of the network terminal device 3, and additionally includes a second browser screen 38 for displaying the home page of the network printer 6.

The browser screen 38 is provided with a text box 39 where a PDF file to be printed by the network printer 6 is specified.

In the network terminal device 7, a network address or URL is extracted from the PDF file displayed on the browser screen 33 and transcribed to the text box 39 in the second browser screen 38, whereupon the network address is transmitted to the network printer 6, so that the network printer 6 downloads and prints the PDF file 51. Such a function to print a PDF file by downloading the PDF file based on the network address thereof at the network printer end is referred to as pull printing. The pull printing can omit jobs of the network terminal device 7 including the download of a PDF file and processing in the PDF reader 35 and printer driver 37. Hence, the functions of the network terminal device 7 occupied by a print job are reduced dramatically, thereby making it possible to improve work efficiency of the network terminal device 7.

Alternatively, the user may prefer to download a PDF file to the network terminal device 7 and then print the same by the network printer 6. In this case, the download of the PDF file is a must, but the processing in the PDF reader 35 and printer driver 37 can be omitted. As a result, the work efficiency of the network terminal device 7 can be improved as well.

However, in order to execute the pull printing, the user of the above-described conventional network terminal device 7 has to open the browser screen 33 and the second browser screen 38 on the Web browser 32, and transcribe the network address of the PDF file from the browser screen 33 to the text box 39 in the second browser screen 38. Hence, when there are many PDF files to be printed, the user has to repetitively specify the following PDF file by switching between the browser screen 33 and the second browser screen 38 and transcribe the network address of the specified PDF file, which makes an overall operation too complicated.

SUMMARY OF THE INVENTION

The present invention is devised to solve the problems described above, and therefore, has an object to provide a print instruction program and a print instruction method that make it easier for the user to instruct a print operation while viewing a Web page on the Web browser even when there are many PDF files to be printed.

In order to achieve the above and other objects, a first aspect of the invention provides a print instruction program, stored in a network terminal device outputting a print instruction to a printer with a PDF direct printing function linked to a communication network, for allowing the network terminal device to function as a data control unit for controlling PDF direct print data by obtaining mouse event data and file name data on a location where a mouse pointer is positioned from a plug-in unit that adds functions to a browser program; a data accumulation unit for storing the file name data; a data display unit for adding a direct print menu for a PDF file in a menu screen displayed in association with clicking of a mouse button; and a data transmission unit for sending the file name data to the printer with a PDF direct printing function.

A second aspect of the invention provides a print instruction program according to the first aspect, wherein the data control unit changes the mouse pointer to a PDF file specific form when it has determined that the file name data is of a PDF file.

A third aspect of the invention provides a print instruction program according to the first aspect, wherein the data accumulation unit stores a plurality of PDF file names with their respective address data in a list form.

A fourth aspect of the invention provides a print instruction program according to the third aspect, wherein the direct print menu includes a menu item for sequentially printing PDF files whose file names are included in the list stored in the data accumulation unit.

A fifth aspect of the invention provides a print instruction program according to the third aspect, wherein the direct print menu includes a menu item for displaying the list of the PDF file names stored in the data accumulation unit.

A sixth aspect of the invention provides a print instruction program according to the third aspect, wherein the direct print menu includes a menu item for adding a PDF file name of a new print target at a bottom of the list of the PDF file names stored in the data accumulation unit.

A seventh aspect of the invention provides a print instruction program according to the third aspect, wherein the data control unit checks the address data of the PDF files stored in the list, so that, for a PDF file to be downloaded from a network address on the Internet, a URL (Uniform Resource Locator) of that PDF file is sent to the printer, and for a PDF file stored at a local address in the network terminal device, that PDF file is sent to the printer.

An eighth aspect of the invention provides a print instruction method of outputting a print instruction from a network terminal device to a printer with a PDF direct printing function linked to a communication network, comprising the steps of checking whether a print target file specified by a mouse pointer on a browser screen is a PDF file; checking whether the specified file is to be printed by pull printing; if the pull printing is indicated, reading a PDF direct print menu screen by clicking a mouse while the mouse pointer is kept specifying the file; storing a network address of the specified file by selecting a menu item to execute direct printing of a PDF file on the PDF direct print menu screen; outputting the network address of the specified file to the printer with a PDF direct printing function.

A ninth aspect of the invention provides a print instruction method according to the eighth aspect, wherein if the pull printing is not indicated in the step of checking whether the specified file is to be printed by pull printing, the PDF direct print menu screen is read out by clicking the mouse while the mouse pointer is kept specifying the file, the specified PDF file is downloaded and saved in the network terminal device by selecting a menu item for saving an object in a file on the PDF direct print menu screen, and the specified PDF file is outputted to the printer with a PDF direct printing function.

A tenth aspect of the invention provides a print instruction method according to the eighth or ninth aspect, wherein the step of checking whether a print target file is a PDF file checks based on indication of a file name of the print target file.

An eleventh aspect of the invention provides a print instruction method according to the tenth aspect, wherein the checking based on the indication of a file name is performed by determining whether a PDF file specific mouse pointer is displayed in the vicinity of the file name.

A twelfth aspect of the invention provides a print instruction method according to the eighth aspect, wherein the step of storing the network address adds the network address to a bottom of a list of PDF files to be printed.

A thirteenth aspect of the invention provides a print instruction according to the twelfth aspect, wherein when a network addresses of a specified PDF file is to be outputted to the printer with a PDF direct printing function by using the list of the PDF files to be printed, it is determined whether pull printing or push printing is performed, depending on the address of the specified PDF file which is either a network address or a local address.

PREFERRED EMBODIMENTS OF THE INVENTION

The preferred embodiments of the present invention will next be described with reference to the accompanying drawings.

Figure 1:
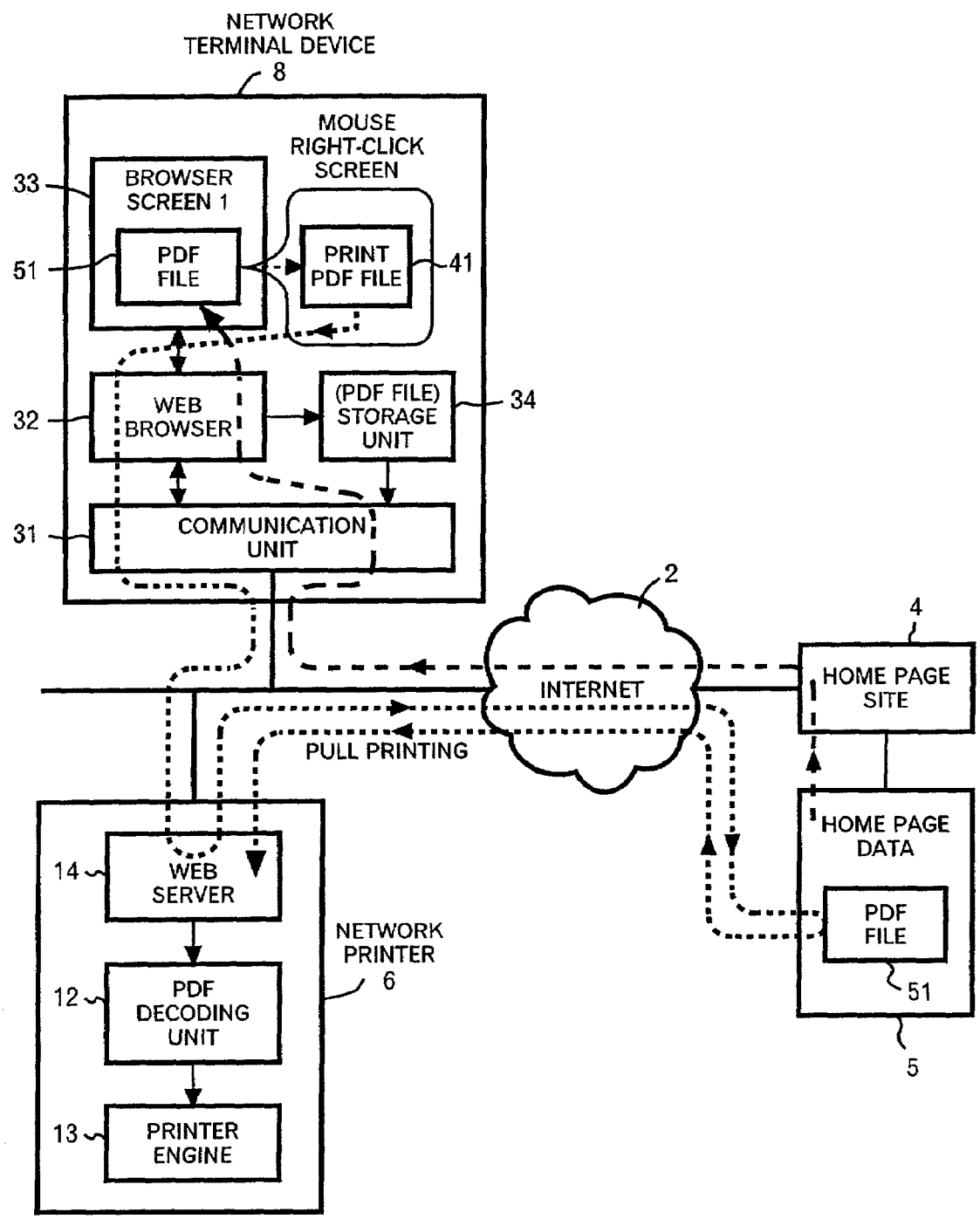
FIG. 1 is a view showing each function of a network printer with a PDF direct printing capability and of a network terminal device according to one embodiment of the present invention.

FIG. 1 illustrates each function of a network printer with a PDF direct printing capability and of a network terminal device according to one embodiment of the present invention.

Figure 6:
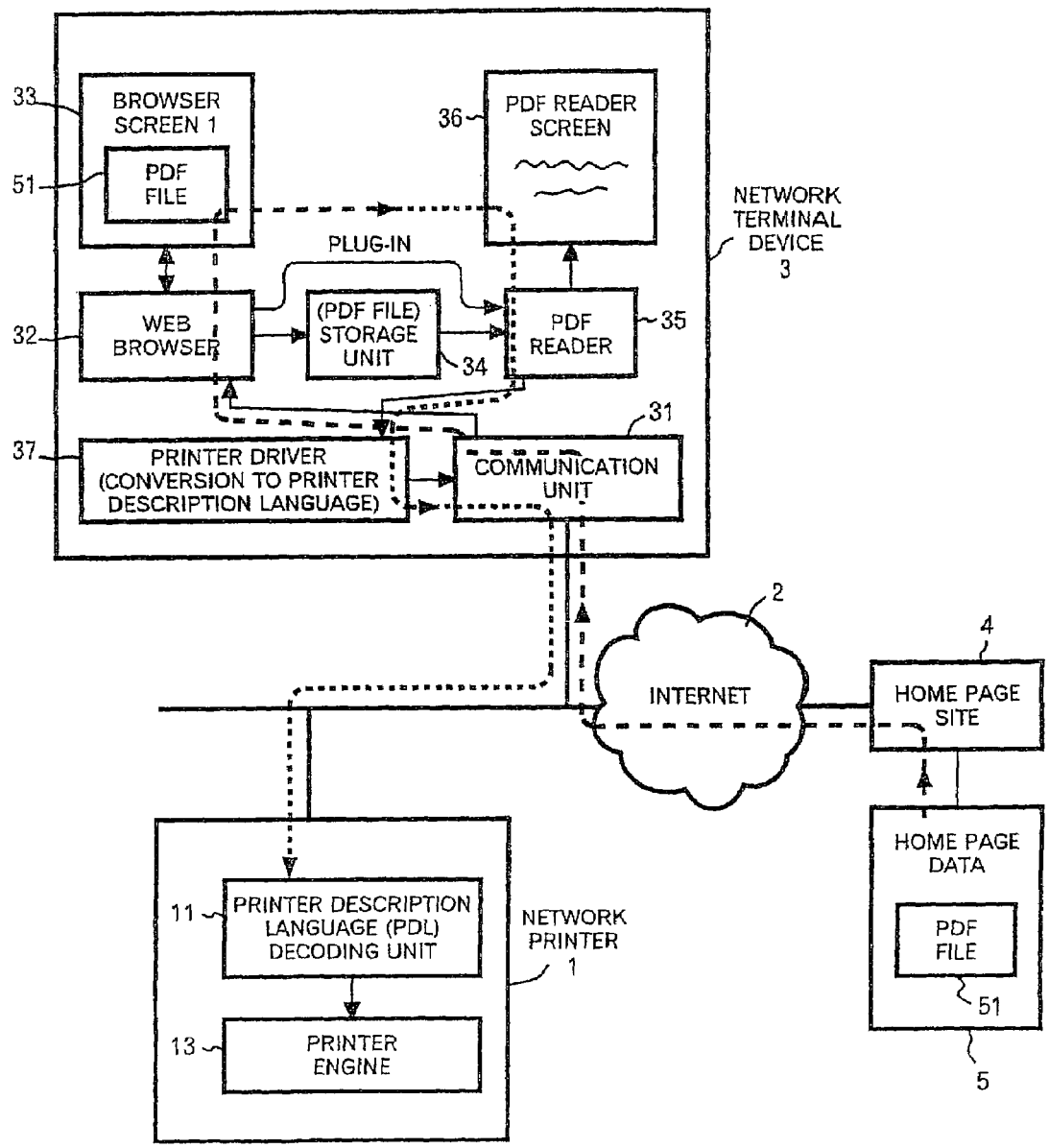
FIG. 6 is a view showing each function of a conventional network printer and a conventional network terminal device.
Figure 7:
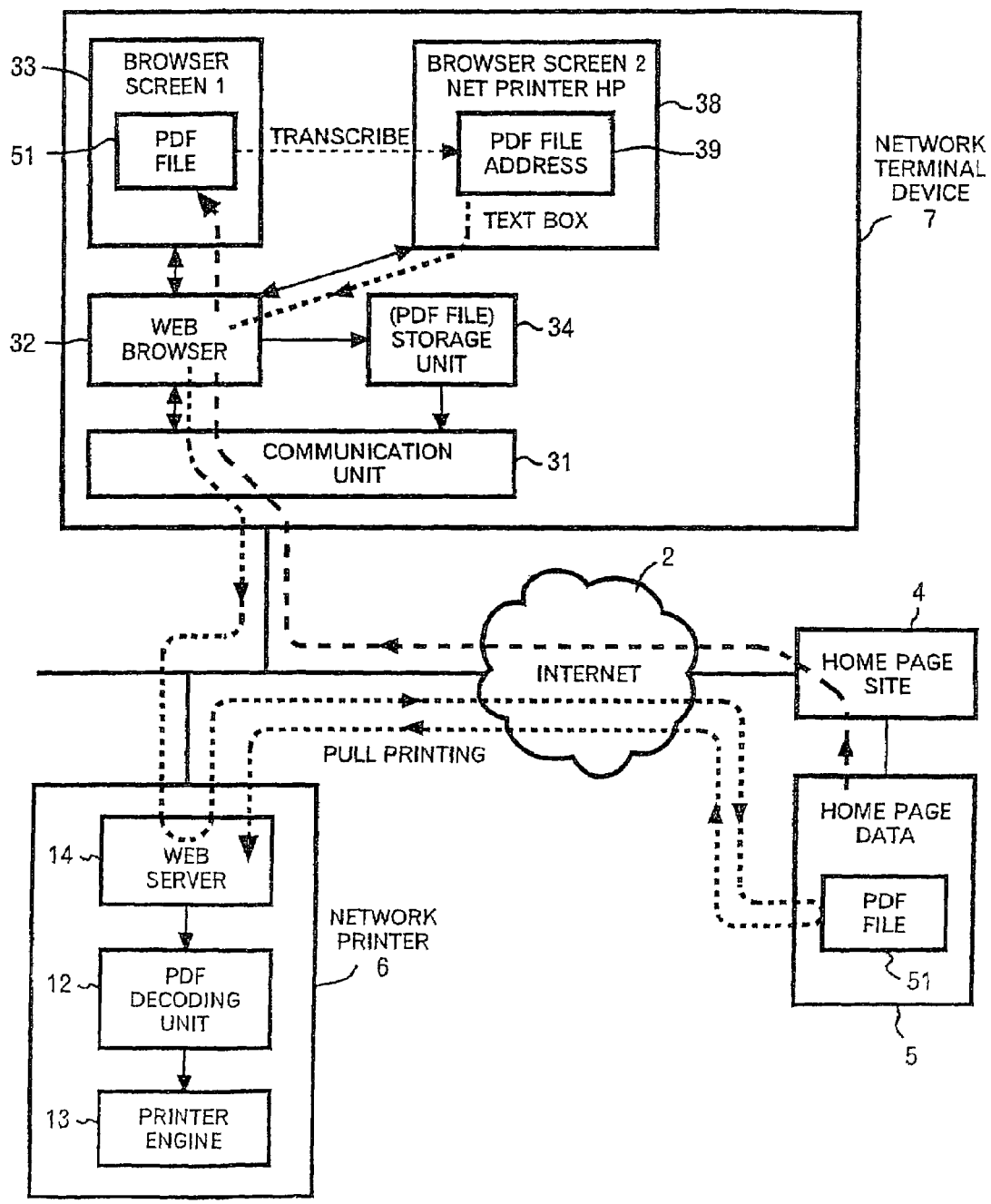
FIG. 7 is a view showing each function of a network printer with a PDF direct printing capability and the conventional network terminal device.

In FIG. 1, like components functioning in the same manner as those of the conventional network terminal devices and their peripheral structures shown in FIGS. 6 and 7 are labeled with like reference numerals, and the description of these components is not repeated for ease of explanation.

A network terminal device 8 of FIG. 1 is different from the network terminal device 7 of FIG. 7 in that it does not send a network address or URL of a PDF file by using the second browser screen 38, but instead, it allows the user to select PDF direct printing on a menu screen 41 appearing by a right-click of a mouse in case the operating system (OS) is Microsoft Windows®. According to this arrangement, the user can specify to print a PDF file by right-clicking the mouse on the browser screen 33 each time a PDF file appears. Hence, the user no longer has to specify the following PDF file by switching between the browser screen 33 and the second browser screen 38 and transcribe the network address of the specified PDF file as in the conventional system. Here, the right-click of the mouse means to click a right button of a two button mouse which is normally supported in Microsoft Windows. When a different OS is used in the present embodiment, the menu screen for PDF direct printing may be displayed by, for example, double-clicking with a single button mouse, or by clicking a center or right button of a three button mouse.

Figure 2:
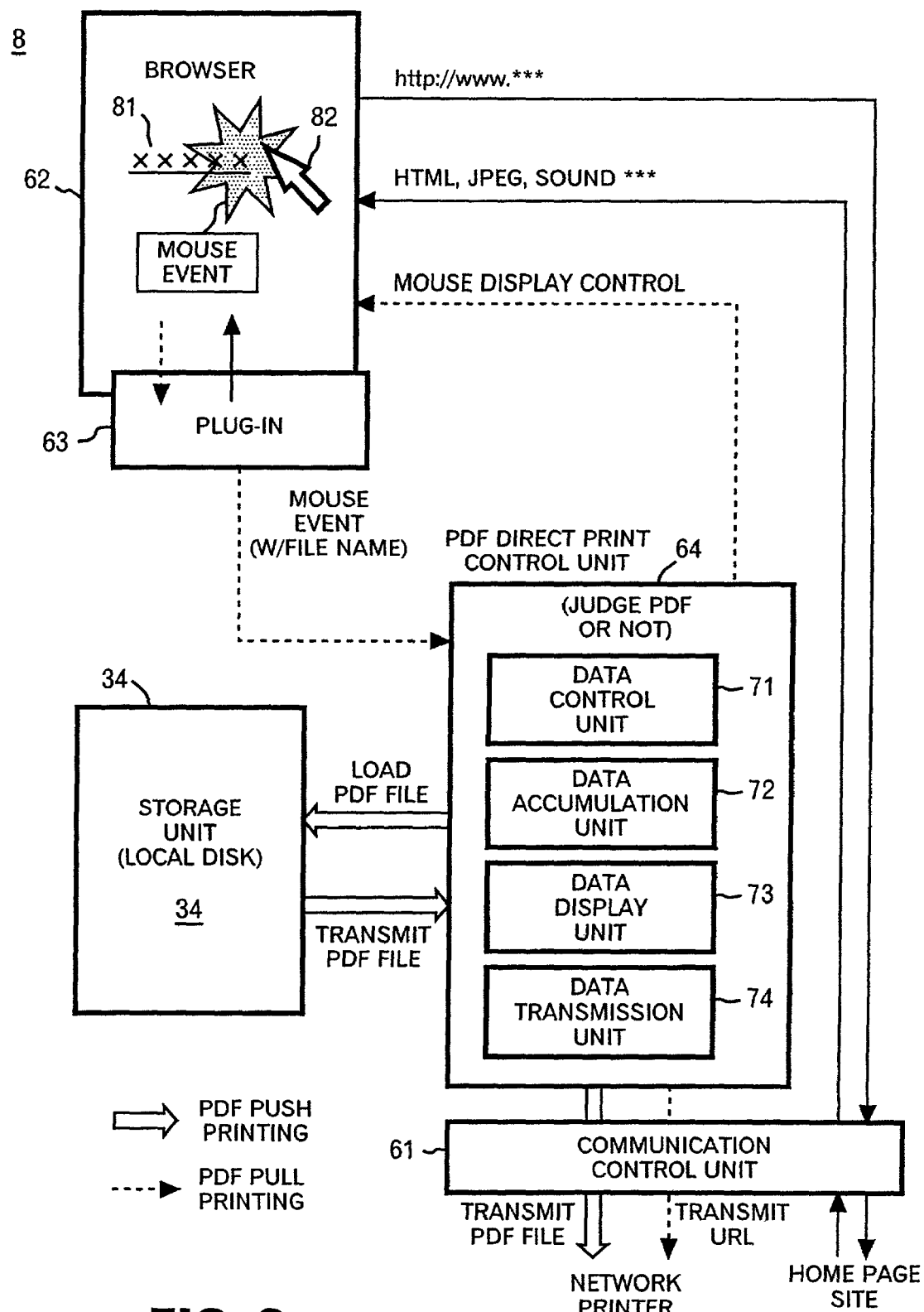
FIG. 2 is a view showing each function of the network terminal device of FIG. 1 mainly in terms of programs.

FIG. 2 illustrates each function of the network terminal device 8 of FIG. 1 mainly in terms of a program.

A communication control unit 61 corresponds to the communication unit 31 of FIG. 1, and is furnished with a data converting function so that data can be exchanged with an external network. A browser unit 62 corresponds to the Web browser 32 and browser screen 33 of FIG. 1, into which files of HTML, JPEG, Sound, etc. are inputted, and from which network addresses (URLs) beginning with "http://www." are outputted. The browser unit 62 is provided with a link 81 and a mouse pointer 82 inside thereof, and a mouse event occurs when the display position of the mouse pointer 82 is superimposed on that of the link 81. A plug-in unit 63 for providing extra functions is incorporated in the browser unit 62. A storage unit 34 is identical with the storage unit 34 of FIG. 1. Besides the foregoing components, the present embodiment includes a PDF direct print control unit 64, provided between the browser unit 62 and plug-in unit 63 and the communication control unit 61, for controlling PDF direct printing by monitoring a mouse event, and by controlling the display of the mouse pointer and an onscreen menu appearing with a right-click of the mouse.

The plug-in unit 63 may be replaced with a component produced by the ActiveX® technologies developed from OLE (Object Linking and Embedding) which is an object management system of Microsoft Corporation.

The PDF direct print control unit 64 includes: a data control unit 71 for judging whether the contents displayed at the link 81 is of a PDF file from, for example, the extension at the end of the file name; a data accumulation unit 72 for storing the network addresses, local addresses, etc. of PDF files; a data display unit 73 for changing the shape or position of the displayed mouse pointer 82 and for displaying a menu appearing by a right-click of the mouse instead of the mouse pointer; and a data transmission unit 74 for transmitting URLs or PDF files to the network printer 6.

Figure 3:
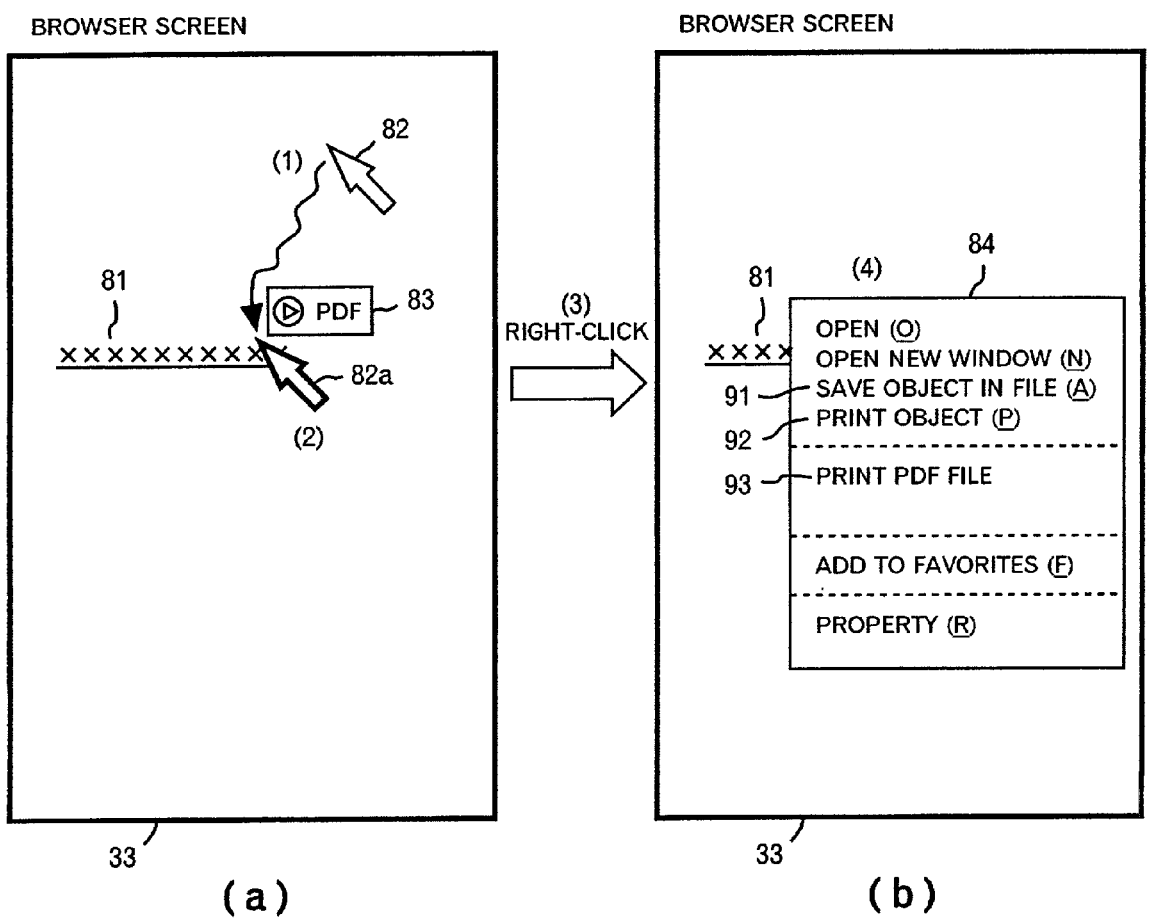
FIG. 3(*a*) illustrates exemplary positions of a link and a mouse pointer displayed on a browser screen, and FIG. 3(*b*) illustrates exemplary positions of the link and a menu displayed on the browser screen.

FIG. 3(a) illustrates exemplary positions of the link 81 and mouse pointer 82 displayed on the browser screen 33, and FIG. 3(b) illustrates exemplary positions of the link 81 and a menu displayed on the browser screen 33.

With referring to FIG. 3(a), when the mouse pointer 82 is moved from a position (1) to a position (2), the position of the mouse pointer 82a is superimposed on that of the link 81, whereupon a mouse event occurs. Upon occurrence of the mouse event, the data control unit 71 checks whether the link 81 represents a PDF file, based on the file name, address, etc. read from the link 81. If the link 81 represents a PDF file, the data control unit 71 controls the data display unit 73 so that a PDF indicator or icon 83 is displayed in the vicinity of the mouse pointer 82a or the link 81. Alternatively, the PDF indicator 83 may replace the mouse pointer 82a. Consequently, the user of the network terminal device 8 can know immediately that the file displayed on the screen is a PDF file.

When the user wishes to print out the contents under the file name displayed at the link 81, the user clicks the right button of the mouse while the PDF indicator 83 is kept displayed (3). Then, the data control unit 71 controls the data accumulation unit 72 and data display unit 73 so that, as shown in FIG. 3(b), a right-click menu screen 84 is displayed on the browser screen 33 instead of the mouse pointer 82a and PDF indicator 83.

When the user wishes to perform push printing after downloading the PDF file into the storage unit 34, the user selects a "Save Object in File (A)" line 91 on the right-click menu screen 84. When the user wishes to print the target file or object by using a printer driver, the user selects a "Print Object (P)" line 92. When the user wishes to print the PDF file directly, the user selects a "Print PDF File" line 93.

The URL of the PDF file sent from the network terminal device 8 to the network printer 6 is received by the Web server 14 in the network printer 6. Then, the Web server 14 downloads the PDF file 51 from the home page site 4 and sends the same to the PDF decoding unit 12. The PDF file 51 decoded by the PDF decoding unit 12 is printed out by the printer engine 13.

Figure 4:
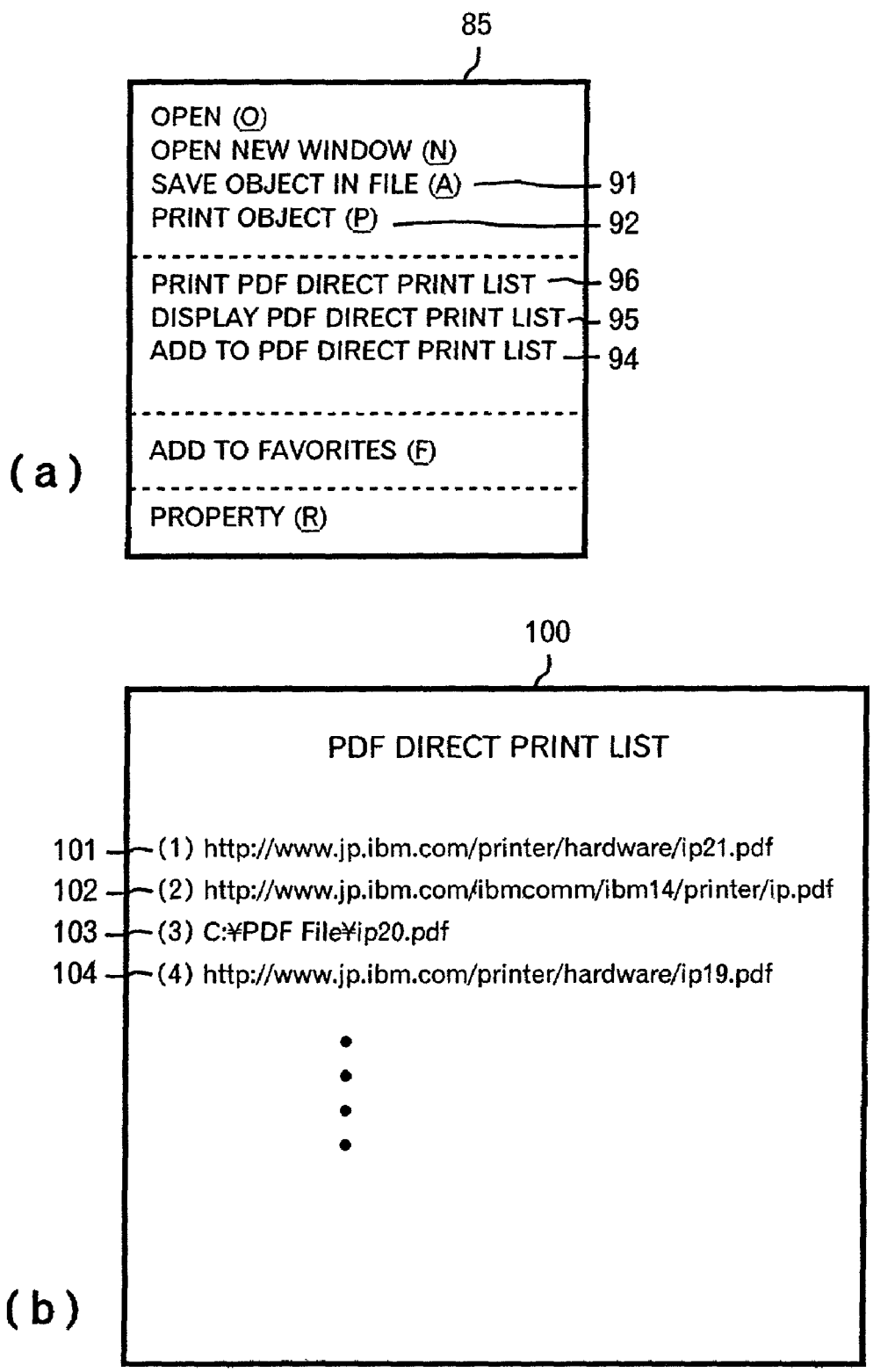
FIG. 4(*a*) illustrates the right-click menu screen of FIG. 3(*b*) in a list form, and FIG. 4(*b*) illustrates one example of a PDF direct print list.

FIG. 4(a) illustrates the right-click menu screen 84 of FIG. 3(b) in a list form.

The "Save Object in File (A)" line 91 and the "Print Object (P)" line 92 are the same as those of FIG. 3(b), but the "Print PDF File" line 93 is replaced with three different lines, i.e., "Add to PDF Direct Print List" line 94, "Display PDF Direct Print List" line 95, and "Print PDF Direct Print List" line 96.

FIG. 4(b) illustrates one example of a PDF direct print list.

The PDF direct print list 100 contains URLs in the first, second, and fourth rows 101, 102 and 104, respectively, and a local address including a file name which may follow one or more folder or directory names in the third row 103. The data control unit 71 of the present embodiment can determine the location of a PDF file whether its address in the list is a URL indicating an address on the network or a local address in the storage unit 34 in the network terminal device 8, as is shown in FIG. 4(b), and can selectively output a print instruction for the push printing in the case of the local address or for the pull printing in the case of the network address.

The "Add to PDF Direct Print List" line 94 in FIG. 4(a) is a command option to, for example, add a new URL or local address at the bottom of the PDF direct print list 100. Also, the "Display PDF Direct Print List" line 95 is a command option to display the PDF direct print list 100 on the browser screen 33, and the "Print PDF Direct Print List" line 96 is a command option to output the URLs and local addresses stored at the respective rows of the PDF direct print list 100 in order from the top and to make the network printer 6 print them.

Figure 5:
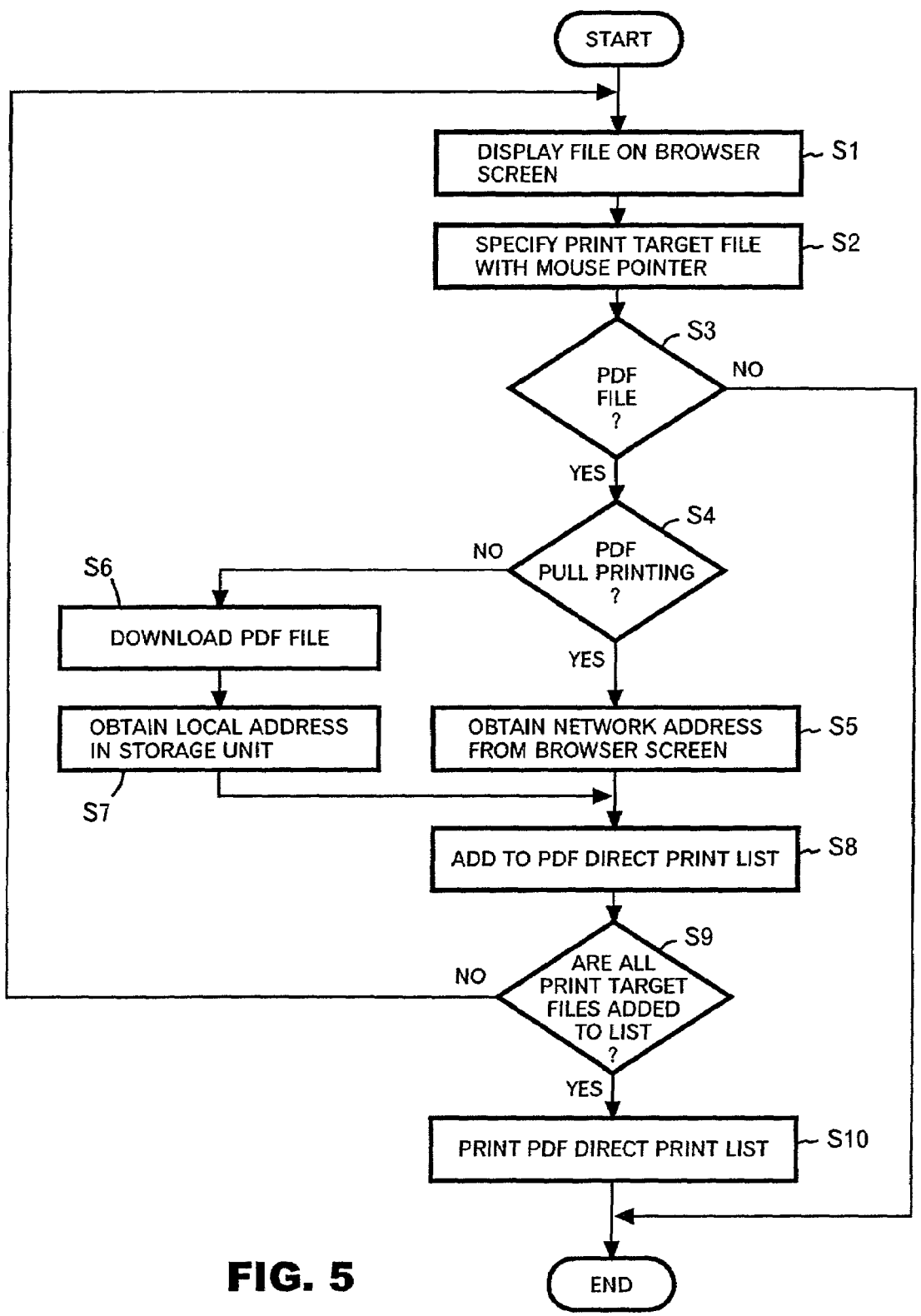
FIG. 5 is a flowchart of processing in the network terminal device for outputting a print instruction to the network printer having the PDF direct printing function.

FIG. 5 is a flowchart of processing in the network terminal device 8 for outputting a print instruction to the network printer 6 having the PDF direct printing function.

Initially, the user accesses the home page site 4 on the browser screen 33 of the network terminal device 8 to display a file name of a print target (step S1). Next, the user moves the mouse pointer onto the displayed file name to specify the print target file (step S2).

Then, it is determined whether the file name indicated at the link 81 is of a PDF file by checking whether the PDF indicator 83, which may be a PDF file specific mouse pointer, is displayed as shown in FIG. 3(a), or whether the contents in the address column displayed outside of the frame of the browser screen 33 ends with "pdf", for example, "XXXX.pdf" (step S3). If the file name is not of a PDF file (NO in step 3), the PDF direct print instruction is terminated, and a print instruction which uses a conventional printer driver may be issued.

If the file name is of a PDF file (YES in step 3), the user is prompted to select either the PDF push printing after downloading the data of the PDF file to the network terminal device 8, or the PDF pull printing because the user needs only a printed output of the PDF file and not the data itself (step S4).

If the PDF pull printing is selected (YES in step S4), the network address (URL) of the print target file is obtained from the browser screen 33 and stored in the data accumulation unit 72 (Step S5) when the user, for example, right-clicks on the mouse while the mouse pointer is specifying the target PDF file to display the right-click menu for PDF direct printing as shown in FIG. 4(a), and selects the "Add to PDF Direct Print List" line 94. The network address thus obtained is added to the bottom of the PDF direct print list 100 shown in FIG. 4(b) (Step S8).

On the other hand, if the PDF push printing is selected (NO in step S4), the PDF file is downloaded to the storage unit 34 (Step S6) when the right-click menu shown in FIG. 4(a) is displayed, and the "Save Object in File (A)" line 91 is selected, for example. When the download ends, its local address in the storage unit 34 is obtained (step S7). Then, the local address thus obtained is added to the bottom of the PDF direct print list 100 shown in FIG. 4(b) (step S8).

Next, it is determined whether all the print target files are selected and their addresses are added to the list (step S9). If one or more print target files remain unselected (NO in step S9), the flow returns to step S1 and a file name is displayed on the browser screen 33. However, if all the print target files have been selected and their addresses have been stored in the list (YES in step S9), the "Print PDF Direct Print List" line 96 shown in FIG. 4(a) may be selected by the user to output a print instruction for all the print target files whose addresses are stored in the list (step S10).

When the print instruction is outputted, each network address in the list is determined to be for pull printing and, therefore, directly outputted to the network printer 6, while each local address is determined to be for push printing and, therefore, the PDF file specified by that local address is read out from the storage unit 34 and outputted to the network printer 6.

Upon receipt of a network address, the network printer 6 downloads a corresponding PDF file from the received network address through the Web server 14. After the PDF file is downloaded, the network printer 6 decodes the file by the PDF decoding unit 12 and prints out the decoded PDF file by the printer engine 13.

In this manner, according to the print instruction program and print instruction method of the preset invention, a menu screen is displayed by a right-click of a mouse while viewing a Web page on a Web browser, from which a user may give a print instruction, and addresses of print target PDF files are held in a list form, so that the user can easily instruct a print operation even when there are many print target PDF files.

ADVANTAGES OF THE INVENTION

As described above, according to the present invention, a menu screen is displayed by a right-click of a mouse while viewing a Web page on a Web browser, from which a user may give a print instruction, and addresses of print target PDF files are held in a list form, so that the user can easily instruct a print operation even when there are many print target PDF files.

The invention claimed is:

1. A method comprising:
   displaying a link to a file on a browser screen;
   in response to detecting that a mouse pointer is positioned over the link, determining if the file is a Portable Document Format (PDF) file;
   in response to determining that the file is a PDF file, displaying a PDF indicator near the link on the browser screen;
   in response to detecting a click of the PDF indicator, presenting, on the browser screen, a menu screen that includes a first print option and a second print option, wherein selecting the first print option directly stores the PDF file to a storage unit, and wherein selecting the second print option stores a Uniform Resource Locator (URL) address, which references the PDF file, to the storage unit; and
   printing PDF files from the storage unit by push printing stored PDF files and pull printing PDF files through use of stored URL addresses.

2. The method of claim 1, further comprising:
   presenting a third option on the menu screen, wherein selecting the third option directly causes a list, of all PDF files that are print pending, to be displayed on the browser screen.

3. The method of claim 2, wherein the third option cannot be executed until a determination has been made by a user that all print target PDF files have been selected and all print target PDF file addresses have been stored as a print list in the storage unit.

4. The method of claim 1, wherein the click of the PDF indicator is a right-click of a mouse.

5. The method of claim 1, wherein the PDF indicator replaces the mouse pointer being displayed on the browser screen.

6. The method of claim 5, wherein the menu screen replaces the PDF indicator being displayed on the browser screen.

7. A system comprising:
   a browser screen for displaying a link to a file;
   a Portable Document Format (PDF) direct print control unit for, in response to a determination that a mouse point is positioned over the link, determining if the file is a PDF file;
   a data display unit for, in response to a determination that the file is a PDF file, displaying a PDF indicator near the link on the browser screen;
   a plug-in unit for, in response to detecting a click of the PDF indicator, presenting, a menu screen that includes a first print option and a second print option, wherein selecting the first print option directly stores the PDF file to a storage unit, and wherein selecting the second print option stores a Uniform Resource Locator (URL) address, which references the PDF file, to the storage unit; and
   a data transmission unit for transmitting, to a printer, stored PDF files and stored URL addresses, wherein the stored URL addresses are associated with referenced PDF files.

8. The system of claim 7, wherein the plug-in unit further presents a third option on the menu screen, wherein selecting the third option directly causes a list of all PDF files, which are print pending, to be displayed on the browser screen.

9. The system of claim 8, wherein the third option cannot be executed until a determination has been made that all print target PDF files have been selected and all print target PDF file addresses have been stored as a print list in the storage unit.

10. The system of claim 7, wherein the click of the PDF indicator is a right-click of a mouse.

11. The system of claim 7, wherein the PDF indicator replaces the mouse pointer being displayed on the browser screen.

12. The system of claim 11, wherein the menu screen replaces the PDF indicator being displayed on the browser screen.

13. A computer-readable medium encoded with a computer program that, when executed, performs the steps of:
  displaying a link to a file on a browser screen;
  in response to detecting that a mouse pointer is positioned over the link, determining if the file is a Portable Document Format (PDF) file;
  in response to determining that the file is a PDF file, displaying a PDF indicator near the link on the browser screen;
  in response to detecting a click of the PDF indicator, presenting, on the browser screen, a menu screen that includes a first print option and a second print option, wherein selecting the first print option directly stores the PDF file to a storage unit, and wherein selecting the second print option stores a Uniform Resource Locator (URL) address, which references the PDF file, to the storage unit; and
  printing PDF files from the storage unit by push printing stored PDF files and pull printing PDF files through use of stored URL addresses.

14. The computer-readable medium of claim 13, wherein the computer program further performs the step of:
  presenting a third option on the menu screen, wherein selecting the third option directly causes a list of all PDF files, which are print pending, to be displayed on the browser screen.

15. The computer-readable medium of claim 14, wherein the third option cannot be executed until a determination has been made that all print target PDF files have been selected and all print target PDF file addresses have been stored as a print list in the storage unit.

16. The computer-readable medium of claim 13, wherein the click of the PDF indicator is a right-click of a mouse.

17. The computer-readable medium of claim 13, wherein the PDF indicator replaces the mouse pointer being displayed on the browser screen.

18. The computer-readable medium of claim 17, wherein the menu screen replaces the PDF indicator being displayed on the browser screen.

* * * * *